J. JOYCE.
DASH POT.
APPLICATION FILED AUG. 9, 1915.
1,195,028.
Patented Aug. 15, 1916.
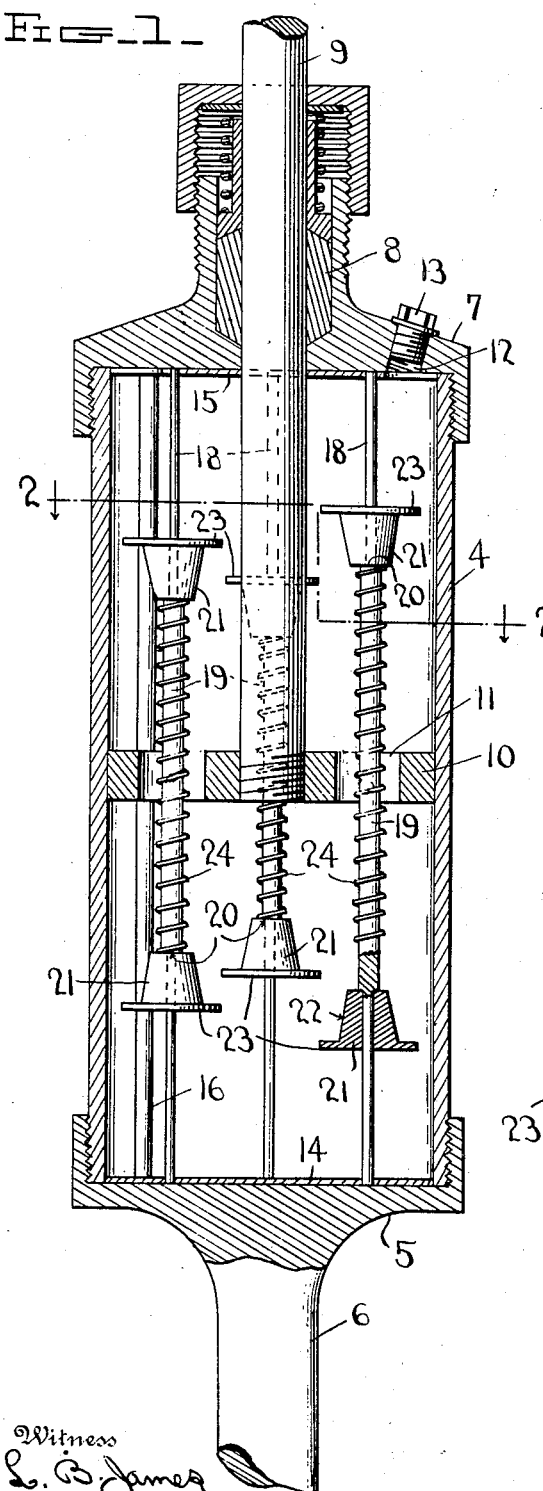
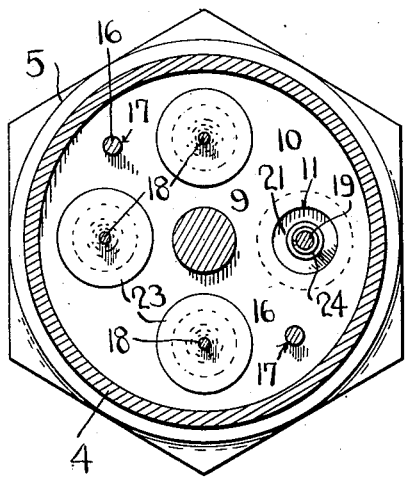
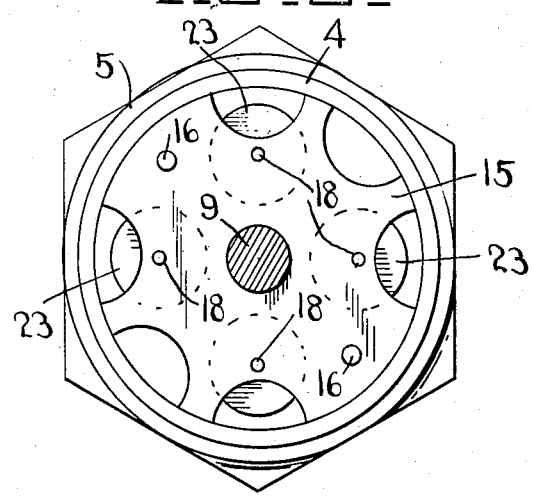
Witness
L. B. James
Inventor
John Joyce
By
Attorney

UNITED STATES PATENT OFFICE.

JOHN JOYCE, OF OSWEGO, NEW YORK.

DASH-POT.

1,195,028.  Specification of Letters Patent.  Patented Aug. 15, 1916.

Application filed August 9, 1915. Serial No. 44,575.

*To all whom it may concern:*

Be it known that I, JOHN JOYCE, a citizen of the United States, residing at Oswego, in the county of Oswego and State of New York, have invented new and useful Improvements in Dash-Pots, of which the following is a specification.

The present invention relates to shock absorbers and rebound preventers for automobiles and for other purposes of an analogous character.

The primary object is to provide a simple and effective structure that is novel in its character, and that will permit a quick initial movement, but will afford a successively increased resistance if the shock or jar produces an abnormal relative movement of the parts.

A preferred form of construction is illustrated in the accompanying drawings, wherein:—

Figure 1 is a vertical sectional view through the device. Fig. 2 is a horizontal sectional view on the line 2—2 of Fig. 1. Fig. 3 is a plan view with the upper cylinder head removed.

Similar reference numerals designate corresponding parts in all the figures of the drawings.

In the embodiment illustrated, a cylinder member is employed, comprising a cylindrical body wall 4, to the lower end of which is suitably attached a head 5 having a stem 6 that can be connected to one of the movable parts. The upper end of the body wall has secured thereto a head 7 provided with a stuffing box or gland 8, and through which passes a piston rod 9 that is connected to the other of the relatively movable parts, as will be readily understood to those skilled in the art.

The inner end of the piston rod 9 is connected to a piston member 10 having a plurality of ports 11 therethrough, which will permit the passage of fluid from one side of the piston to the other, as said piston moves longitudinally in the cylinder member. Preferably oil is employed as the fluid, and this may be supplied to the interior of the cylinder member through a port 12 closed by a screw plug 13. Arranged within the said cylinder member is a valve carrying cage, the same consisting of a lower disk 14 that rests against the head 5, and an upper disk 15 that in like manner is disposed against the inner face of the head 7.

These two disks are connected by suitable rods 16 that slidably and snugly pass through openings 17 formed in the piston. Extending between the disks and having their ends mounted therein, are valve supporting stems 18, said stems extending through the ports 11 and having their central portions enlarged, as illustrated at 19, thereby producing abutment shoulders 20. It will be noted that the shoulders of the different stems are located different distances apart.

Slidably mounted on the terminal portions of the stems 18, are plug valves 21 having tapered body portions 22 and cap flanges 23. These valves are located on opposite sides of the piston and normally bear against the shoulders 20, being held thereagainst by springs 24 coiled around the intermediate portions 19 of the stems and suitably connected to said valve. It will thus be seen that a set of valves is disposed on opposite sides of the piston, and the valves of each set are located at different points along the path of movement of said piston. Moreover each valve will enter one of the ports if the piston is moved sufficiently far, and will gradually contract and finally close such port. Moreover it will be noted that the ports will be closed successively if the piston moves a sufficient distance in either direction. It is therefore believed that the operation of the structure will be clear. Assuming that the cylinder is filled, or substantially filled with oil, or other fluid, the piston can move for a considerable distance without material resistance, as the area of the ports 11 is sufficiently great to permit the ready passage of the oil from one side the piston to the other, but if an abnormal movement of the piston takes place with respect to the cylinder in either direction, first one of the ports will be contracted, and finally closed, then a second port will in like manner be controlled, and if the piston moves far enough, all four will be closed. The result is a gradually increased resistance to the movement of the piston, which will check such movement, and finally bring it to a standstill. In this connection, it will be noted that the valves are so arranged that when one is closing, its port, the next will be coming into operation.

From the foregoing, it is thought that the construction, operation and many advantages of the herein described invention will be apparent to those skilled in the art, without further description, and it will be understood that various changes in the size, shape, proportion, and minor details of construction may be resorted to without departing from the spirit or sacrificing any of the advantages of the invention.

Having thus fully described my invention, what I claim as new and desire to secure by Letters Patent, is:—

1. In a device of the character set forth, the combination with a cylinder member, of a piston member operating therein and having a port for permitting the passage of a fluid from one side to the other, a valve support, and a valve movably mounted on the support for controlling the port, said piston member being movable into and out of engagement with the valve and thereby causing its automatic movement therewith on the support.

2. In a device of the character set forth, the combination with a cylinder member, of a piston member operating therein and having a port for permitting the passage of fluid from one side to the other, and movable valves located on opposite sides of the piston member and adapted to close the port when said piston member moves a predetermined distance in either direction, said piston engaging and moving the valve with it.

3. In a device of the character set forth, the combination with a cylinder member, of a piston member operating therein and having a port for permitting the passage of a fluid from one side to the other, a valve support extending through the port, and a valve movably mounted on the support and arranged to control said port when the piston member moves to a predetermined position, said valve being engaged and moved by the piston.

4. In a device of the character set forth, the combination with a cylinder member, of a piston member operating therein and having a port for permitting the passage of a fluid from one side to the other, a fixed valve supporting stem extending through the port, and a valve slidably and yieldingly mounted on the stem and arranged to close said port when the piston member moves into engagement therewith.

5. In a device of the character set forth, the combination with a cylinder member, of a piston member operating therein and having a port for permitting the passage of a fluid from one side to the other, a valve support extending through the port, and valves movably mounted on the support on opposite sides of the piston member, and engaged and moved thereby.

6. In a device of the character set forth, the combination with a cylinder member, of a piston member operating therein and having a port for permitting the passage of a fluid from one side to the other, a fixed supporting valve stem extending through the port and having shoulders, valves located against said shoulders on opposite sides of the piston member and arranged to respectively close the port as the piston member moves a sufficient distance in either direction, and yielding means for normally holding the valves against the shoulder.

7. In a device of the character set forth, the combination with a cylinder member, of a piston operating therein and having means for permitting the passage of fluid through the same, and mechanism movable in the cylinder member and operated by the piston for progressively restricting the said means accordingly as the piston member is moved.

8. In a device of the character set forth, the combination with a cylinder member, of a piston member operating therein and having means for permitting the passage of fluid through the same, and mechanism movably mounted in the cylinder member and operated by the piston for progressively restricting the said means accordingly as the piston member is moved in either direction.

9. In a device of the character set forth, the combination with a cylinder member, of a piston operating therein and having a plurality of ports for permitting the passage of fluid therethrough, and a set of valves on each side of the piston for controlling the respective ports, the valves of each set being located at different points in the path of movement of said piston to successively control said ports upon the movement of the piston in either direction, and the valves of one set being out of coaction with the ports when a valve of the other set is in such coaction.

10. In a device of the character set forth, the combination with a cylinder member, of a piston operating therein and having a plurality of ports to permit the passage of fluid therethrough, valve stems extending through the ports longitudinally of the path of movement of the piston, and valves movably mounted on said stems and disposed on opposite sides of the piston, said valves being disposed at different distances along the path of movement of the piston to successively close the ports upon the movement of the piston in either direction.

11. In a device of the character set forth, the combination with a cylinder member, of a piston member operating therein and having ports therethrough for the passage of fluid, a valve cage located in the cylinder member and including valve stems extending through the ports, and valves movably mounted on said stems for closing the ports upon a predetermined movement of the piston member.

12. In a device of the character set forth, the combination with a cylinder member, of a piston operating therein and having ports for the passage of fluid, a cage comprising end disks mounted in the cylinder member, and valve supporting stems connecting the disks and extending through the ports, said stems having shoulders on opposite sides of the piston located at different distances apart, controlling valves slidably mounted on the stems and engaging the shoulders, and springs engaged with the valves to yieldingly hold them against the shoulders, said valves successively closing the ports upon the movement of the piston in either direction.

In testimony whereof I have hereunto set my hand in presence of two subscribing witnesses.

JOHN JOYCE.

Witnesses:
 E. A. Plank,
 Eva C. Mowry.